United States Patent [19]

Hamano

[11] Patent Number: 5,376,250
[45] Date of Patent: Dec. 27, 1994

[54] METHOD OF PRODUCING WATER HAVING A REDUCED SALT CONTENT

[75] Inventor: Toshikatsu Hamano, Tokyo, Japan

[73] Assignee: Asahi Glass Company Ltd., Tokyo, Japan

[21] Appl. No.: 174,518

[22] Filed: Dec. 28, 1993

[30] Foreign Application Priority Data

Dec. 28, 1992 [JP] Japan .............................. 4-360510
Feb. 17, 1993 [JP] Japan .............................. 5-051582

[51] Int. Cl.$^5$ .............................................. C02F 1/469
[52] U.S. Cl. .............................. 204/182.4; 204/182.5; 204/301
[58] Field of Search ................... 204/151, 182.4, 182.5, 204/301

[56] References Cited

U.S. PATENT DOCUMENTS

| | | | |
|---|---|---|---|
| 3,933,617 | 1/1976 | Yamamoto et al. | 204/301 |
| 4,802,966 | 2/1989 | Aoki et al. | 204/182.4 |
| 5,094,732 | 3/1992 | Oldani et al. | 204/182.4 |

Primary Examiner—John Niebling
Assistant Examiner—Arun S. Phasge
Attorney, Agent, or Firm—Oblon, Spivak, McClelland, Maier & Neustadt

[57] ABSTRACT

A method of making water having a low salt content by desalination comprising the steps of alternately arranging pluralities of cation exchange membranes and monovalent anion selective anion exchange membranes or pluralities of anion exchange membranes and monovalent cation selective cation membranes between electrodes thereby alternately forming pluralities of the diluting cells and concentrating cells of an electrodialysis tank; feeding a salt containing water including hardly soluble salts to the plurality of diluting cells of the electrodialysis tank; feeding electricity to the electrodes; maintaining the salt concentration of the concentrated solution in the plurality of concentrating cells to a value of not less than 700 ppm; and retaining as much as possible the polyvalent anions forming the hardly soluble salts in the salt containing water.

5 Claims, 1 Drawing Sheet

METHOD OF PRODUCING WATER HAVING A REDUCED SALT CONTENT

The present invention relates to a method of producing water having a reduced salt content from a water containing salts which include hardly or sparingly soluble salts by an electrodialysis process using ion exchange membranes.

Ground water, lake water, sea water, river water and the like are widely utilized as drinking water or industrial water. These waters contain various quantities of hardly soluble salts such as calcium sulfate along with soluble salts such as sodium chloride. It is therefore necessary to remove these salts to concentrations which do not exceed predetermined values for utilizing these waters. Salt removing methods such as evaporation process and the like are employed in cases wherein the salt concentration is large. However, in cases wherein the salt concentration is small, since the above process is disadvantageous in view of the production cost because a large amount of energy is consumed, electrodialysis process, reverse osmosis process and the like are employed as methods which are small in energy consumption and advantageous in view of the production cost.

Among these, in comparison with the reverse osmosis process, the electrodialysis process is highly promising, since the mass transfer amount is small especially in case wherein the salt concentration is small, and the process is advantageous in view of consumed energy. The principle of the electrodialysis process is shown, for instance, in U.S. Pat. No. 3,933,617, Japanese Unexamined Patent Publication No. 24539/1980 and Japanese Unexamined Patent Publication No. 22356/1980, wherein an electrodialysis tank is provided in which respective pluralities of cation exchange membranes and anion exchange membranes are alternately arranged between electrodes, thereby alternately forming diluting cells and concentrating cells, water to be desalted is fed to the diluting cells, a pertinent aqueous solution of an electrolyte is fed to the concentrating cells, and electricity is fed to the electrodes thereby obtaining water having a low salt content from the diluting cells.

However, in case of the electrodialysis process, when especially hardly soluble salts are included in a salt containing water to be desalted, there are difficulties in the above procedure wherein the hardly soluble salts are precipitated on the surface and at the inside of the cation exchange membranes and the anion exchange membranes facing the concentrating cells of the electrodialysis apparatus. As a result, the electric resistance of the cation exchange membranes increase and the anion exchange membranes and the ion exchange membrane per se are destructed in some cases. In particular, when the concentration of the concentrated solution in the concentrating cells of the electrodialysis apparatus increases thereby decreasing the electric resistance of the whole electrodialysis apparatus, the precipitation of the hardly soluble salts becomes significant and poses a serious problem.

In the most commonly employed conventional means as a means of preventing the above-mentioned difficulties in the electrodialysis process, as disclosed in Japanese Examined Patent Publication No. 15709/1977 and English Patent No. 854595, is a so-called polarity reverse process. In the process, the polarities of the electrodes in the electrodialysis tank are reversed (that is, the anode is converted to the cathode and the cathode is converted to the anode) at predetermined time intervals and the direction of the current flow is reversed and the diluting cells and the concentrating cells are also reversed (that is, the diluting cells are converted to the concentrating cells and the concentrating cells are converted to the diluting cells). Using this method, the above-mentioned problems have been resolved by periodically resolving the hardly or sparingly soluble salts which had precipitated onto the surface and at the inside of the ion exchange membranes.

However, the above polarity reverse process is both complicated and expensive due to problems inherent in the mechanism of the polarity reversal in the electrodialysis apparatus. Namely, the durability of the electrode is problematic and the electrode has to be changed frequently. Furthermore, since the system operation must be temporaly interrupted by reversing the operation of the valves and pipings in accordance with the polarity reversal, the quality of the produced desalted water necessarily becomes inconsistent during the period of reversal.

It is an object of the present invention to provide a method of producing water having a reduced salt content without the difficulties as in the conventional polarity reverse process, and which can produce water having a reduced salt content without allowing the precipitation of the hardly soluble salt onto the surface and on the inside of the ion exchange membranes as in the case of conventional electrodialysis even in cases where the water to be desalted contains the soluble salts.

According to an aspect of the present invention, there is provided a method of producing water having a reduced salt content by desalinization comprising the steps of:

alternately arranging pluralities of cation exchange membranes and monovalent anion selective exchange membranes or pluralities of anion exchange membranes and monovalent cation selective membranes between an anode and a cathode thereby forming alternating pluralities of diluting cells and concentrating cells in an electrodialysis apparatus;

feeding water containing hardly soluble salts to the plurality of diluting cells of said electrodialysis apparatus; and passing electric current to the electrodes;

maintaining the salt concentration of the concentrated solution in the plurality of concentrating cells to not less than 700 ppm.

According to the above-mentioned aspect of the present invention, in the electrodialysis apparatus equiped with monovalent cation selective exchange membranes or the monovalent anion selective exchange membranes, only the monovalent form of either the cations and the anions permeate to the concentrating cells, while the polyvalent cations and anions can not simultaneously permeate, thereby preventing the precipitation of the hardly soluble salts onto the surface and on the inside of the ion exchange membranes.

Figure 1:
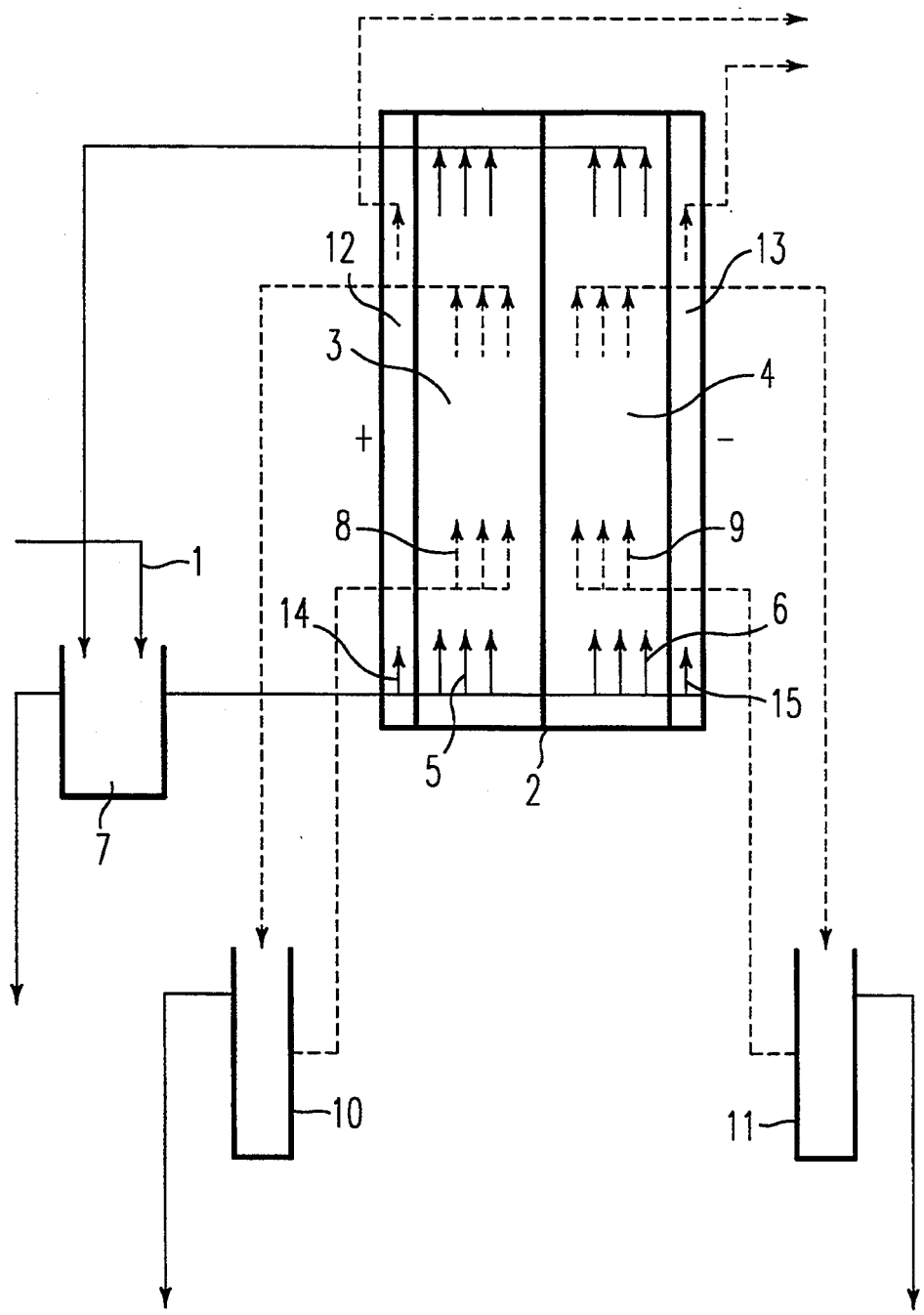
FIG. 1 is a flow chart which explains the principle of the present invention.

A more detailed explanation will be given of the present invention as follows. The water that is to be desalted by the electrodialysis process of this invention includes ground water, river water, lake water, sea water or the like. The water contains 100 through 1,000 ppm of hardly soluble salts such as $CaSO_4$ and the like, and 50 through 5,000 ppm of soluble salts such as sodium, potassium, calcium, magnesium and the like, metal salts of chlorides, sulfates, carbonates, and bicarbonates.

In this invention, the salt containing water is passed through and treated by an electrodialysis apparatus wherein pluralities of cation exchange membranes and monovalent anion selective exchange membranes, or pluralities of anion exchange membranes and monovalent cation selective cation exchange membranes are alternately arranged between an anode and a cathode, thereby forming alternating diluting cells and concentrating cells.

The cation exchange membrane employed in this invention preferably process strongly acidic cation exchange groups such as sulfonic acid groups and having an ion exchange capacity of 0.5 through 10 meq/g dry resin and a thickness of 50 through 500 $\mu$m. The cation exchange membranes of a homogeneous type or an inhomogeneous type can be employed. However, it is preferable to employ a homogeneous type membrane having a matrix of a styrene-divinylbenzene copolymer. The cation exchange membrane can be reinforced with the woven or non-woven fabric of a polyolefin, a polyvinyl chloride, a polyester or the like as needed.

The anion exchange membrane employed in this invention possess preferably a strongly basic anion exchange group such as a quaternary ammonium groups having an ion exchange capacity of 0.5 through 10 meq/g dry resin and a thickness of 50 through 500 $\mu$m. The anion exchange membranes of a homogeneous type or an inhomogeneous type can be employed. However, it is preferable to employ a homogeneous membrane having a matrix of a styrene-divinylbenzene copolymer.

The monovalent anion selective anion exchange membranes used in this invention possess physical properties as in the above-mentioned anion exchange membrane. However, it is preferable to employ a monovalent anion selective exchange membrane having the property which selectively permeates monovalent anions such as $Cl^-$, $NO_3^-$ and the like relative to polyvalent anions such as $SO_4^{2-}$ ions. In this case, it is appropriate that the selective permeability in ratio of monovalent anion as compared to polyvalent anion is not smaller than 2, especially not than 5.

The monovalent cation selective exchange membrane used in this invention posseses the similer physical properties as the above-mentioned cation exchange membrane. However, its selective permeability defined as a ratio of monovalent cation relative to polyvalent cation is preferably no smaller than 2, and especially no smaller than 5, in cases wherein a monovalent cation selective exchange membrane is employed, that is, that it posseses the property of selectively permeating monovalent cations such as sodium ions in comparison with polyvalent cations such as calcium and magnesium ions.

An electrodialysis apparatus wherein preferably respective 10 through 600 sheets of the cation exchange membranes and the monovalent anion selective exchange membranes, or the anion exchange membranes and the monovalent cation selective exchange membranes are alternately arranged between an anode and a cathode thereby forming alternating diluting cells and concentrating cells, is disclosed in U.S. Pat. No. 3,933,617, Japanese Unexamined Patent Publication No. 1674/1979, Japanese Unexamined Patent Publication No. 24538/1980 and Japanese Examined Patent Publication No. 47663/1976. In this invention, a tightening type (filter-press) apparatus is preferably employed.

The salt containing water is fed to the diluting cells of the electrodialysis apparatus preferably at a rate of 5 through 50 cm/sec. It is not always necessary to feed the salt containing water to the concentrating cells of the electrodialysis apparatus, since the cations and the anions are subsequently become transferred from the diluting cells to the concentrating cells along with the tranfer of water after the operation of the electrodialysis has been started. However, the salt containing water is preferably fed to the concentrating cells at a rate of 0.5 through 5 cm/sec from the beginning of the operation.

In accordance with normal operation, an appropriate electrolyte solution, for instance, the same aqueous electrolyte solution fed to the concentrating cells is fed to an anode cell and a cathode cell at either end of the electrodialysis apparatus, each compartment accommodating respectively an anode and a cathode.

In this way, electric current is fed to the electrodialysis apparatus with a current density value not higher than the limiting current density, and preferably 0.1 through 10 $A/dm^2$, so that the cations and the anions forming the salts in the salt containing water that is fed to the diluting cells, are transferred through the cataion exchange and anion exchange membranes into the concentrating cells thereby performing desalinization.

Important concept of the present invention is the use of the monovalent cation selective exchange membranes or the monovalent anion selective exchange membranes during the process of desalination, such that, only monovalent ions are transferred to the concentrating cells through ones of the above-mentioned membranes. That is, when the cation exchange membranes and the monovalent anion selective exchange membranes are employed, the monovalent and polyvalent cations are transferred to the concentrating cell. On the other hand, with respect to the anions, since the monovalent anion exchange membrane having the selective permeability of monovalent anion is employed, bivalent or polyvalent anions such as $SO_4^{2-}$ are maintained preferably by not smaller than 50%, and especially by not smaller than 95% of the concentration of the polyvalent anions contained in the water in the diluting cell before the passage of electricity. Furthermore, it is also possible to transfer approximately selectively monovalent anions such as $Cl^-$, $HCO_3^-$ or $NO_3^-$ to the concentrating cells.

As a result, the hardly soluble salts, for instance, $CaSO_4$, $MgSO_4$ and the like are not formed in large concentrations in the concentrating cells. The concentration of the concentrated cell can be maintained at a value not smaller than 700 ppm, preferably not smaller than 1,500 ppm, and even not smaller than 3,000 ppm, without precipitating the hardly soluble salts onto the surface and on the inside of the ion exchange membranes.

On the other hand, in cases wherein a combination of the monovalent cation selective exchange membranes and the anion exchange membranes are employed, in contrast to the above-mentioned case, $Na^+$ and the like are selectively transferred to the concentrating cells, and $Ca^{2+}$, $Mg^{2+}$ and the like are not transferred thereto. Accordingly, when both of the monovalent anions and the polyvalent anions are transferred to the concentrating cells, the hardly soluble salts are not formed with large concentrations in the concentrating cell.

In this way, according to the present invention, an extremely effective desalinization can be performed without precipitating the hardly soluble salts wherein the salt concentration of the salt containing water can be desalted to, for instance, 1,000 through 2,000 ppm, or 200 through 500 ppm depending on the situation.

In this invention, an electrodialysis is performed by using either of the electrodialysis apparatus provided with the cation exchange membranes and the monovalent anion selective exchange membranes or the electrodialysis apparatus provided with the monovalent cation selective exchange membranes and the anion exchange membranes. Further, the above two kinds of electrodialysis operation can be performed simultaneously in single electrodialysis apparatus or in series plurality of electrodialysis apparatus. In this way, a purified water having an extremely small salt concentration can be produced since both the monovalent ions and the polyvalent ions of the cations and the anions can sufficiently be removed.

The former cases, wherein two kinds of electrodialysis are performed within a single electrodialysis apparatus, are explained as follows.

According to another aspect of the present invention, there is provided a method of producing water having a reduced salt content by desalination comprising the steps of:

employing an electrodialysis apparatus having a first electrodialysis block wherein pluralities of cation exchange membranes and monovalent anion selective exchange membranes are alternately arranged thereby forming pluralities of diluting cells and concentrating cells and a second electrodialysis block wherein pluralities of anion exchange membranes and monovalent cation selective exchange membranes are alternately arranged thereby forming pluralities of diluting cells and concentrating cells, between an anode and a cathode;

feeding a same salt containing water containing hardly soluble salts to the both diluting cells of the first and second electrodialysis blocks;

feeding two different concentrated solutions respectively to the pluralities of concentrating cells of the first and second electrodialysis blocks; and passing electricity to the anode and cathode electrodes.

The electrodialysis apparatus employed in this aspect of this invention, is provided with a structure wherein the diluting cells of the first electrodialysis block and the second electrodialysis block respectively are connected with each other such that a common diluted solution flows through the respective diluting cells, and a structure wherein the concentrating cells of the first electrodialysis block and the second electrodialysis block are not connected to each other such that different concentrated solutions flow through the respective concentrating cells.

In general, a pair of anode and cathode are placed at either end of the electrodialysis apparatus. However, depending on situation, a multiple electrode wall may be provided at the portion which connects the first electrodialysis block to the second electrodialysis block, one face of which operates as the cathode and the other face of which operates as the negative electrode. A skilled person may make arbitrary modifications to this structures within the range of this invention.

As shown in FIG. 1, in which the principle of this invention is illustrated, a salt containing water 1 containing hardly soluble salts is fed to the electrodialysis tank, as two respective diluted solutions 5 and 6 of the first electrodialysis block 3 and the second electrodialysis block 4 of the electrodialysis apparatus 2, preferably at a rate of 5 through 50 cm/sec, and is recirculated through a recirculating tank 7. On the other hand, two respective concentrated solutions 8 and 9 of the two blocks, each of which is separately and appropriately fed with a salt containing water, is circulated through respective recirculation tanks 10 and 11. It is not always necessary to feed the salt containing water to the concentrating cells since the cations and the anions are substantially transferred from the respective adjacent diluting cells along with the transfer of water. However, at the beginning of the operation, the salt containing water is preferably fed to the concentrating cells at a rate of 0.5 through 5 cm/sec.

In the case of FIG. 1, appropriate aqueous solutions of an electrolyte, for instance, aqueous solutions 14 and 15 of an electrolyte which are the same as the diluted solutions 5 and 6, are fed to an anode cell 12 and a cathode cell 13 at either end of the electrodialysis apparatus 2, each equipped with an anode ⊕ and a cathode ⊖.

Electricity is fed to the electrodialysis apparatus with a current density of less than the limiting current density, preferably 0.1 through 10 A/dm$^2$, and the cations and anions forming the salts in the salt containing water fed to the diluting cells are transferred to the concentrating cells respectively through the cation exchange membranes and the anion exchange membranes in the electrodialysis blocks 3 and 4 respectively, thereby performing desalination. The characterizing part of this invention is that, in the first electrodialysis block, all of the monovalent and polyvalent cations forming the salt in the salt containing water are transferred to the concentrating cells.

On the other hand, since the monovalent anion selective exchange membranes are employed, for instance, preferably not less than 50%, especially not less than 90% of the concentration of polyvalent anions such as $SO_4^{2-}$ prior to passing electricity are retained in the diluting cells. Further, only anions such as $Cl^-$, $HCO_3^-$ or $NO_3^-$ are selectively transferred to the concentrating cells.

As a result, in the concentrating cells of the first electrodialysis block, the hardly soluble salts, for instance, $CaSO_4$ and the like are not formed in large concentrations. The salt concentration of the concentrated solution can be maintained to a value of not less than 4,000 ppm, of not less than 7,000 ppm in some cases, and even to a value of not less than 20,000 ppm, without precipitating the hardly soluble salts onto the surface and on the inside of the ion exchange membrane.

In this way, in the first electrodialysis block, the salt concentration of the water can be decreased extremely effectively, for instance, to between 1,000 and 2,000 ppm, or to between 200 and 500 ppm depending on the cases.

On the other hand, in the second electrodialysis block, when the salt containing water is fed to the diluting cells, since the monovalent cation selective exchange membranes are employed, the monovalent cations such as $Na^+$, $K^+$ and the like are selectively transferred to the concentrating cells rather than $Ca^{2+}$ and $Mg^{2+}$, whereas all the monovalent and the polyvalent anions are transferred to the concentrating cells. As a result, also in the concentrating cells of the second electrodialysis block, the hardly soluble salts, for instance, CaSO$_4$ and the like are not formed in large concentrations, and the salt concentration of the concentrated solution can be maintained to a value of not less than 4,000 ppm, not less than 7,000 ppm in some cases, and even to a value of not less than 20,000 ppm, without precipitating the hardly soluble salts onto the surface and on the inside of the ion exchange membranes.

Therefore, in the second electrodialysis block, the desalination can also effectively be performed without precipitating the hardly soluble salts, and producing water having a low salt concentration which is approximately the same as the concentration of the water is obtained from the diluting cells of the first electrodialysis block.

The later case wherein two kind of electrodialysis are performed in series in a plurality of electrodialysis apparatus is explained as follows.

In accordance with another aspect of the present invention, there is provided a method of producing water having a low salt content by desalination comprising the steps of:

alternately arranging pluralities of cation exchange membranes and monovalent selective anion exchange membranes between electrodes thereby forming alternating pluralities of diluting cells and concentrating cells of a first electrodialysis apparatus;

alternately arranging pluralities of anion exchange membranes and monovalent selective cation exchange membranes between electrodes thereby forming alternating pluralities of diluting cells and concentrating cells of a second electrodialysis apparatus;

selecting either the first or the second electrodialysis apparatus as a first stage electrodialysis apparatus and the other one thereof as a second stage electrodialysis apparatus;

feeding a salt containing water containing hardly soluble salts to the plurality of diluting cells of the first stage electrodialysis tank;

feeding a partially desalted water from the first stage electrodialysis apparatus to the plurality of diluting cells of the second stage electrodialysis apparatus;

feeding electricity to the electrodes; and maintaining the salt concentrations of the concentrated solutions in the pluralities of concentrating cells in the first and second stage electrodialysis apparatus to a value of not less than 700 ppm.

Accordingly, the low concentration salt containing water which emerges from the diluting cells of the first stage electrodialysis apparatus is fed to the diluting cells of the second stage electrodialysis apparatus preferably at a rate of 5 through 50 cm/sec. On the other hand, an appropriate electrolyte solution, for instance, the same type salt containing water as the feed water to be desalted is fed to the concentrating cells at a rate of 0.5 through 50 cm/sec. The operational conditions for the second stage electrodialysis apparatus are approximately the same as those of the first electrodialysis apparatus. However, the limiting current density of the second electrodialysis apparatus is smaller than that of the first stage electrodialysis apparatus by a portion owing to the lower salt concentration of the salt containing water in the diluting cells, and to the lower current density of the electricity fed to the apparatus.

In this way, in the second stage electrodialysis apparatus, the salt containing water having a low concentration is further desalted. In the desalination procedure, for instance, when the electrodialysis apparatus using the cation exchange membranes and monovalent anion selective exchange membranes, is employed as the first electrodialysis apparatus, a considerable amount of the polyvalent cations such as Ca$^{2+}$ which form the least soluble salt, are removed in the first stage electrodialysis apparatus. Accordingly, when, in the second stage electrodialysis apparatus, the polyvalent anions such as SO$_4{}^{2-}$ are transferred to the concentrating cells by employing an anion exchange membranes having no selective permeability to monovalent anions, and electricity is fed to the electrodialysis apparatus while maintaining the salt concentration in the concentrating cells to a value of not less than 700 ppm, no trouble is caused by the precipitation of the hardly soluble salts.

In addition, particularly when the monovalent cation selective exchange membranes are used in the second stage electrodialysis apparatus, the transfer of polyvalent cations of such as Ca$^{2+}$ and Mg$^{2+}$ to the concentrating cells through the cation exchange membranes, can sufficiently be restrained. Therefore, even when electricity is fed to the electrodes while maintaining the salt concentration in the concentrating cells is maintained to a value of not less than 1,000 ppm, or not less than 3,000 ppm, depending on the situation, the desalination can be performed while almost completely restraining the formation of the hardly soluble salts.

At the same time, according to this invention, the polyvalent anions in the salt containing water are sufficiently removed in the second stage electrodialysis apparatus to allow the production of water having a low salt concentration of between 20 and 500 ppm which is lower than the salt concentration which can be obtained from a single stage through the electrodialysis apparatus, such water being excellent for industrial water, drinking water, or water for uses.

Although several Examples are shown as follows, the scope of the present invention is naturally not restricted to these Examples. For instance, in the case of a multistage electrodialysis operation as mentioned above, an electrodialysis apparatus using standard cation exchange membranes and anion exchange membranes each having no monovalent selective permeability, as the second stage electrodialysis apparatus, or an electrodialysis apparatus having the same combination of the ion exchange membrane as the first and the second stage apparatus, may be also adopted, thereby enabling to produce water having low salt concentration.

EXAMPLE 1

A filter-press type electrodialysis apparatus of Selemion CS-O type (Asahi Glass Company Ltd.) was employed, wherein respectively 10 sheets of strongly acidic cation exchange membranes, "Selemion CMV" (made by Asahi Glass Company Ltd., a styrene-divinylbenzene copolymer membrane having sulfonic acid groups; ion exchange capacity: 3.4 meq/g dry resin; thickness: 150 μm) and 10 sheets of monovalent anion selective strongly basic exchange membranes "Selemion ASV" (made by Asahi Glass Company Ltd., a styrene-divinylbenzene copolymer membrane having quaternary ammonium groups; ion exchange capacity: 3.4 meq/g dry resin; thickness: 140 μm) were arranged in alternating sequence, each membrane separated by interposed polypropylene spacers. The whole arrangement was positioned between an anode and a cathode.

A salt containing water (original solution) having the composition shown in Table 1 was fed to the diluting cells of the electrodialysis apparatus, at a rate of 6 l/hr, from a diluted solution tank, by a recirculating pump. The salt containing water with the same composition as mentioned above was recirculated and fed to the concentrating cells, the cathode cell and the anode cell by a circulating pump from the condensed solution tank, and electrode solution tanks respectively. A voltage of 15 V was supplied to the electrodialysis tank from a direct current power source, and electricity was passed through the electrodialysis apparatus with a current density of 0.17 A/dm$^2$.

TABLE 1

|  | Original solution (ppm) | Desalted solution (ppm) | Concentrated solution (ppm) |
| --- | --- | --- | --- |
| Al | 0.10 | 0.07 | 0.26 |
| Ca | 150.00 | 31.44 | 1185.57 |
| Cu | 0.05 | 0.04 | 0.13 |
| Mg | 50.00 | 32.44 | 175.64 |
| Mn | 0.20 | 0.14 | 0.61 |
| K | 9.00 | 5.05 | 39.52 |
| Na | 150.00 | 86.52 | 677.36 |
| Ba | 0.05 | 0.03 | 0.15 |
| Fe | 0.30 | 0.21 | 0.92 |
| Total | 359.70 | 155.94 | 2080.17 |
| HCO$_3$ | 250.00 | 66.25 | 1837.50 |
| Cl | 225.00 | 26.55 | 1984.50 |
| F | 0.50 | 0.06 | 4.41 |
| NO$_3$ | 50.00 | 3.45 | 465.50 |
| SO$_4$ | 350.00 | 301.00 | 490.00 |
| Total | 875.50 | 397.31 | 4781.91 |
| TDS | 1235.20 | 553.25 | 6862.08 |

When the system had stabilized after it had been operated for a period of time, the compositions of the diluted and concentrated solutions flowing out of the diluted solution tank and the concentrated solution tank, were analyzed as shown in Table 1. As is apparent from this data, the solubility product of Ca$^{2+}$ and SO$_4^{2-}$ in the concentrated solution is 0.00015 (mol/l)$^2$, which does not reach the saturation level of CaSO$_4$.

After a continuous operation was performed in about one week under the above-mentioned condition, the electrodialysis apparatus was disassembled and checked. Then, it was confirmed that there was no precipitation of the hardly soluble salts such as CaSO$_4$ on the surface and on the inside of the ion exchange membranes.

EXAMPLE 2

A filter-press type electrodialysis apparatus was assembled similarly to that of Example 1, by using respectively 10 sheets of monovalent cation selective strongly acidic exchange membranes "Selemion CSV" (made by Asahi Glass Company Ltd., a styrene-divinylbenzene copolymer membrane having sulfonic acid group; ion exchange capacity: 3.4 meq/g dry resin; thickness: 150 μm) and 10 sheets of strongly basic anion exchange membranes "Selemion AMV" (made by Asahi Glass Company Ltd., a styrene-divinylbenzene copolymer membrane having quaternary ammonium groups; ion exchange capacity: 4.5 meq/g dry resin; thickness: 150 μm).

A low concentration salt containing water (original solution) which had been discharged from the diluting cells of the electrodialysis apparatus of Example 1, was fed to diluting cells of an electrodialysis apparatus, while salt containing water having the same concentration was introduced into the concentrated cells, the anode cell and the cathode cell, and the operation was performed similarly to Example 1, yielding a diluted and a concentrated solution having the compositions shown in Table 2.

TABLE 2

|  | Original solution (ppm) | Desalted solution (ppm) | Concentrated solution (ppm) |
| --- | --- | --- | --- |
| Al | 0.07 | 0.06 | 0.14 |
| Ca | 31.44 | 25.41 | 60.37 |
| Cu | 0.04 | 0.03 | 0.07 |
| Mg | 32.44 | 24.13 | 83.04 |
| Mn | 0.14 | 0.11 | 0.27 |
| K | 5.05 | 1.82 | 32.31 |
| Na | 86.52 | 17.30 | 692.20 |
| Ba | 0.03 | 0.03 | 0.08 |
| Fe | 0.21 | 0.16 | 0.42 |
| Total | 115.94 | 69.05 | 868.94 |
| HCO$_3$ | 66.25 | 51.43 | 148.22 |
| Cl | 26.55 | 22.17 | 43.77 |
| F | 0.06 | 0.05 | 0.14 |
| NO$_3$ | 3.45 | 2.26 | 11.86 |
| SO$_4$ | 301.00 | 123.79 | 1772.14 |
| Total | 397.31 | 199.70 | 1976.12 |
| TDS | 553.25 | 268.75 | 2845.06 |

After a continuous operation had been performed for approximately 168 hours under the condition, the electrodialysis apparatus was disassembled and checked. Then, it was confirmed that there was no precipitation of the hardly soluble salts such as CaSO$_4$ on the surface and on the inside of the ion exchange membranes.

COMPARATIVE EXAMPLE 1

An electrodialysis apparatus was assembled similarly to that of Example 1 except that the strongly basic anion exchange membranes used in Example 2 having no selective permeability of monovalent anions were used instead of the monovalent anion selective strongly basic exchange membrane of the electrodialysis apparatus of Example 1.

The electrodialysis operation of a salt containing water was carried out similarly to that of Example 1 employing a similar electrodialysis apparatus. Then, the recirculation rate of the concentrated solution was decreased and the current density was lowered after about two hours of operation. Thereafter, the operation was stopped and the electrodialysis apparatus was disassembled. It was noted that CaSO$_4$ had precipitated not only onto the surface but also onto the inside of the ion exchange membranes.

EXAMPLE 3

A first electrodialysis block was prepared wherein were arranged respectively 10 sheets of cation exchange membranes "Selemion CMV" (made by Asahi Glass Company Ltd., a styrene-divinylbenzene copolymer membrane having sulfonic acid groups; ion exchange capacity: 3.4 meq/g dry resin; thickness: 150 μm) and 10 sheets of monovalent anion selective strongly basic exchange membranes "Selemion ASV" (made by Asahi Glass Company Ltd., a styrene-divinylbenzene copolymer membrane having quaternary ammonium groups; ion exchange capacity: 3.4 meq/g dry resin; thickness: 140 μm) in alternating sequence, each membrane separated with interposed polypropylene spacers.

In addition, a second electrodialysis block was also prepared similarly to the first electrodialysis block, wherein were arranged respectively 10 sheets of monovalent cation selective exchange membranes, "Selemion CMV" (made by Asahi Glass Company Ltd., a styrene-divinylbenzene copolymer membrane having sulfonic acid groups; ion exchange capacity: 3.4 meq/g dry resin; thickness: 150 μm) which had been surface-treated by a polyamine and made selectively permeable to monovalent cation, and 10 sheets of anion exchange membranes "Selemion AMV" (made by Asahi Glass Company Ltd., a styrene-divinylbenzene copolymer membrane having quaternary ammonium groups; ion exchange capacity: 4.5 meq/g dry resin; thickness: 150 μm).

An electrodialysis apparatus was assembled wherein the first and second electrodialysis block of the apparatus were arranged in series between an anode and a cathode. As shown in FIG. 1, the diluted solutions of each block communicated width each other, but concentrated solutions of the each blocks flowed independently from each other.

The salt containing water (original solution) shown in Table 1 was fed to the diluting cells of the electrodialysis apparatus by a recirculating pump through a diluted solution tank at a rate of 40 l/hr. A salt containing water having the same composition as the original solution was recirculated and fed to the concentrating cells, cathode cells and anode cells of both the first and the second electrodialysis blocks, respectively through the concentrating solution tanks and a discharge tank. Electricity was fed to the apparatus from a direct current power source at a voltage of 15 V.

As a result, the current density of the electrodialysis apparatus was 0.2 A/dm$^2$. Brine having a salt concentration of 400 ppm flowed out of the diluting cells at a ratio of approximately 36 l/hr. Brine having a salt concentration of approximately 12,000 ppm and brine having a salt concentration of approximately 6,000 ppm flowed out from the concentrating cells of the first and second electrodialysis block of the apparatus respectively at a ratio of approximately 2 l/hr.

After the electrodialysis apparatus had been operated for a period of time and the operation system had reached equilibrium, the compositions of the solutions flowing out respectively from the diluted solution tanks and the concentrated tanks, were measured, and the result was tabulated in Table 3 (unit: ppm).

TABLE 3

|  | Original solution | Concentrated solution of 1st block | Concentrated solution of 2nd block | Diluted solution |
|---|---|---|---|---|
| Al | 0.10 | 0.57 | 0.38 | 0.05 |
| Ca | 150.00 | 1646.73 | 690.86 | 33.12 |
| Cu | 0.05 | 0.29 | 0.19 | 0.03 |
| Mg | 50.00 | 492.97 | 231.54 | 13.77 |
| Mn | 0.20 | 1.33 | 0.82 | 0.09 |
| K | 9.00 | 88.73 | 41.68 | 2.49 |
| Na | 150.00 | 1309.63 | 698.19 | 53.87 |
| Ba | 0.05 | 0.33 | 0.21 | 0.02 |
| Fe | 0.30 | 2.00 | 1.23 | 0.14 |
| Total-C | 359.70 | 3542.58 | 1665.09 | 103.44 |
| HCO$_3$ | 250.00 | 3070.11 | 529.30 | 70.03 |
| Cl | 225.00 | 3497.57 | 342.15 | 33.01 |
| F | 0.50 | 6.93 | 0.90 | 0.11 |
| NO$_3$ | 50.00 | 778.15 | 106.70 | 5.76 |
| SO$_4$ | 350.00 | 965.88 | 3115.70 | 145.92 |
| Total-A | 875.50 | 8318.64 | 4094.73 | 254.83 |
| Total | 1235.20 | 11861.22 | 5759.83 | 358.27 |

It is apparent from Table 3 that the solubility product of Ca$^{2+}$ and SO$_4^{2+}$ ions in the respective concentrated solutions of the first and second block is (0.00015 mol/l)$^2$, which does not reach the saturation level of CaSO$_4$.

After the electrodialysis apparatus had been continuously operated further under the above-mentioned conditions, the electrodialysis apparatus was disassembled and checked. Then, it was confirmed that no precipitation of CaSO$_4$ was found on the surface and on the inside of the membrane.

COMPARATIVE EXAMPLE 2

A test similar to that of Example 3 was performed by preparing and using an electrodialysis apparatus similar to that of Example 3 except that the monovalent ion selective exchange membranes were not employed as the ion exchange membranes for the first and second electrodialysis block and instead, the Selemion CMV type membrane was employed for the cation exchange membranes and the Selemion AMV type membrane was employed for the anion exchange membranes. In addition, after several hours of operation, the recirculation rates of the respective recirculation solutions were decreased, and the current density was lowered. Thereafter, the electrodialysis operation was stopped and the electrodialysis apparatus was disassembled.

It was found that on the inside of the electrodialysis apparatus, CaSO$_4$ had precipitated not only on the membrane faces but also on the frames of the concentrating cells and over the entire surface and on the inside of the ion exchange membranes of the concentrating cells.

As a result of the present invention, water having a low salt content of 10 through 2,000 ppm can continuously be produced over a long period of time by desalting a salt containing water which includes hardly soluble salts through the electrodialysis process described in this invention, without precipitating the hardly soluble salts on the surface and on the inside of ion exchange membranes.

What is claimed is:

1. A method of producing water having a reduced salt content by desalination comprising the steps of:
    alternately arranging pluralities of cation exchange membranes and monovalent anion selective exchange membranes between an anode and a cathode, thereby alternately forming pluralities of diluting cells and concentrating cells of a first electrodialysis apparatus;
    alternately arranging pluralities of anion exchange membranes and monovalent cation selective exchange membranes between an anode and a cathode, thereby alternately forming pluralities of diluting and concentrating cells of a second electrodialysis apparatus;
    selecting either the first or the second electrodialysis apparatus as a first stage electrodialysis apparatus and the other one thereof as a second stage electrodialysis apparatus;
    feeding a salt containing water containing hardly soluble salts to the plurality of diluting cells of the first stage electrodialysis apparatus;
    feeding a partially desalted water from the first stage electrodialysis apparatus to the plurality of diluting cells of the second stage electrodialysis apparatus;
    feeding electricity to the electrodes; and
    maintaining the salt concentrations of the concentrated solutions in the pluralities of the concentrating cells in the first and second stage electrodialysis apparatus to a value of not less than 700 ppm.

2. The method of producing water having a reduced salt content by desalination according to claim 1, wherein polyvalent cation forming the hardly soluble salts is $Ca^{2+}$ and polyvalent anion forming the hardly soluble salts is $SO_4^{2+}$.

3. A method of producing water having a reduced salt content by desalination comprising the steps of:

employing an electrodialysis apparatus having a first electrodialysis block wherein pluralities of cation exchange membranes and monovalent anion selective exchange membranes are alternately arranged thereby forming pluralities of diluting cells and concentrating cells and a second electrodialysis block wherein pluralities of anion exchange membranes and monovalent cation selective exchange membranes are alternately arranged thereby forming pluralities of diluting and concentrating cells, between an anode and a cathode;

feeding a salt containing water containing hardly soluble salts to the pluralities of diluting cells of the first and second electrodialysis blocks;

respectively feeding two different concentrated solutions to the pluralities of concentrating cells of the first and second electrodialysis blocks; and feeding electricity to the electrodes.

4. The method of producing water having a reduced salt content by desalination according to claim 3, wherein the salt concentrations of the concentrated solutions of the first and second electrodialysis blocks are maintained at a value of not less than 4,000 ppm.

5. The method of producing water having a reduced salt content by desalination according to claim 3, wherein anion of the hardly soluble salts are sulfuric acid ion and cation of the hardly soluble salts are calcium ions.

* * * * *